US008121744B2

(12) United States Patent

Sell et al.

(10) Patent No.: US 8,121,744 B2
(45) Date of Patent: Feb. 21, 2012

(54) CONTROL SYSTEM AND METHOD FOR OXYGEN SENSOR HEATER CONTROL

(75) Inventors: Jeffrey A. Sell, West Bloomfield, MI (US); Bradley Gibson, Swartz Creek, MI (US); Christopher P Musienko, Waterford, MI (US)

(73) Assignee: GM Global Technology Operations LLC

( * ) Notice: Subject to any disclaimer, the term of this patent is extended or adjusted under 35 U.S.C. 154(b) by 480 days.

(21) Appl. No.: 12/179,781

(22) Filed: Jul. 25, 2008

(65) Prior Publication Data

US 2009/0319085 A1 Dec. 24, 2009

Related U.S. Application Data

(60) Provisional application No. 61/074,274, filed on Jun. 20, 2008.

(51) Int. Cl.
*G05D 23/00* (2006.01)

(52) U.S. Cl. ......... 700/300; 700/299; 701/109; 204/424

(58) Field of Classification Search .................. 700/275, 700/276, 299, 300; 701/109, 113; 204/408, 204/424, 425, 426; 205/784, 785
See application file for complete search history.

(56) References Cited

U.S. PATENT DOCUMENTS 4,226,692 A * 10/1980 Isenberg ........................ 204/406
4,430,191 A * 2/1984 Sone et al. ..................... 204/425
4,510,036 A * 4/1985 Takeuchi et al. .............. 204/425
4,538,575 A * 9/1985 Chujo et al. .................. 123/683
4,543,176 A * 9/1985 Harada et al. ................. 204/406
4,719,895 A * 1/1988 Mieno et al. .................. 123/689
4,873,642 A * 10/1989 Mieno et al. .................. 701/109
5,011,590 A * 4/1991 Nakajima et al. ............. 204/425
5,781,878 A * 7/1998 Mizoguchi et al. ........... 701/109
6,214,207 B1 * 4/2001 Miyata et al. ................ 205/785
6,309,536 B1 * 10/2001 Inagaki et al. ................ 204/425
6,586,711 B2 * 7/2003 Whitney et al. ............... 219/497
6,679,238 B2 * 1/2004 Nebiyeloul-Kifle et al. . 123/676
6,696,673 B2 * 2/2004 Okamoto ...................... 219/494
6,870,142 B2 * 3/2005 Hada et al. .................... 219/494
7,603,227 B2 * 10/2009 Watanabe et al. ............. 701/113
7,820,949 B2 * 10/2010 Sasaki et al. .................. 219/497
2001/0003922 A1 * 6/2001 Engel ......................... 73/204.11
2002/0179443 A1 * 12/2002 Hada et al. .................... 204/408
2005/0006368 A1 * 1/2005 Sell et al. ...................... 219/202
2006/0042965 A1 * 3/2006 Sasaki et al. .................. 205/784
2006/0199271 A1 * 9/2006 Lian et al. ..................... 436/155
2007/0012565 A1 * 1/2007 Suzuki et al. .................. 204/424

FOREIGN PATENT DOCUMENTS

DE 10015282 A1 11/2000

OTHER PUBLICATIONS

U.S. Appl. No. 12/132,653, filed Jun. 4, 2008, Adams et al.

* cited by examiner

*Primary Examiner* — Charles Kasenge

(57) ABSTRACT

The present disclosure provides a control system for a heating element used in an oxygen sensor. The control system comprises a rate module that periodically determines a rate of change of current through the heating element and a temperature adjustment module that periodically compares the rate of change and a rate value. The temperature adjustment module selectively adjusts an operating temperature of the oxygen sensor between a normal temperature and a remedial temperature lower than the normal temperature based on the comparison of the rate of change and the rate value. The present disclosure also provides a related control method for the heating element.

20 Claims, 3 Drawing Sheets

CONTROL SYSTEM AND METHOD FOR OXYGEN SENSOR HEATER CONTROL

CROSS-REFERENCE TO RELATED APPLICATIONS

This application claims the benefit of U.S. Provisional Application No. 61/074,274, filed on Jun. 20, 2008. The disclosure of the above application is incorporated herein by reference.

FIELD

The present disclosure relates to control systems for internal combustion engines, and more particularly, to oxygen sensor heater control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. The engine system 100 includes an engine 102 that may be used to produce power by combusting fuel in the presence of air. Typically, air is drawn into the engine 102 through an intake manifold 104. A throttle valve 106 may be used to vary the volume of air drawn into the intake manifold 104. The air mixes with fuel that may be dispensed by one or more fuel injectors 108 to form an air and fuel (A/F) mixture. The A/F mixture is combusted within one or more cylinders of the engine 102, such as cylinder 110. Combustion of the A/F mixture may be initiated by spark provided by a spark plug 112. Exhaust gas produced during combustion may be expelled from the cylinders to an exhaust system 114.

The exhaust system 114 may include one or more oxygen sensors, such as oxygen sensor 116, that may be used to measure the amount of oxygen in the exhaust gas. The oxygen sensor 116 may be threaded into a hole provided in the exhaust system 114 and thereby be disposed within a flow of the exhaust gas. The oxygen sensor may output a voltage corresponding to the quantity of oxygen in the exhaust gas. It may be desired to operate the oxygen sensor 116 above a particular temperature, such as a sensitivity temperature, in order to ensure a reliable output voltage. Accordingly, the oxygen sensor 116 may include a heater that receives power from a heater power supply 118. The heater may be used to supply supplemental heat and thereby bias the oxygen sensor 116 to within an operating temperature range above the sensitivity temperature.

An engine control module (ECM) 120 may be used to regulate the operation of the engine system 100. The ECM 120 may receive the output voltage of the oxygen sensor 116, along with signals from other sensors 122. The other sensors 122 may include, for example, a manifold absolute pressure (MAP) sensor and an intake air temperature (IAT) sensor. Based on the output voltage of the oxygen sensor 116, the ECM 120 may regulate the A/F mixture by regulating the throttle valve 106 and fuel injectors 108. The ECM 120 may also regulate the A/F mixture based on the signals it receives from the other sensors 122.

The temperature of the oxygen sensor 116 may be below the sensitivity temperature when the engine 102 is started. Accordingly, the output voltage of the oxygen sensor 116 may be unreliable for a period of time after engine startup. While the output voltage of the oxygen sensor 116 is deemed unreliable, the ECM 120 may regulate the A/F mixture independent of the output voltage of the oxygen sensor 116.

Heat provided by the exhaust gas and the heater may be used to bring the temperature of the oxygen sensor 116 above the sensitivity temperature. However, for a period of time after engine startup, water condensate present within the exhaust system 114 may become entrained in the exhaust gas come in contact with the oxygen sensor 116. Liquid water that comes into contact with the oxygen sensor 116 may cause thermal shock to the oxygen sensor 116. Repeated thermal shock to the oxygen sensor 116 may induce fractures in the oxygen sensor 116 and result in premature failure.

SUMMARY

The present disclosure provides a control system and method for detecting liquid water that may have come in contact with an oxygen sensor and operating a heater included with the oxygen sensor at a reduced power to ameliorate thermal shock to the oxygen sensor.

In one form, the present disclosure provides a control system for the heating element used in the oxygen sensor comprising a rate module that periodically determines a rate of change of current through the heating element; and a temperature adjustment module that periodically compares the rate of change and a rate value and selectively adjusts an operating temperature of the oxygen sensor between a normal temperature and a remedial temperature lower than the normal temperature based on the comparison of the rate of change and the rate value. In one example, the remedial temperature may be lower than a thermal shock temperature of the oxygen sensor. In another example, the operating temperature may be the operating temperature of a sensing element and the remedial temperature may greater than a sensitivity temperature of the sensing element.

In one feature, the control system may further comprise a power supply module that supplies a power to the heating element based on a power control signal, wherein the temperature adjustment module generates the power control signal to adjust the operating temperature.

In another feature, the temperature adjustment module adjusts the operating temperature towards the remedial temperature when the rate of change is greater than or equal to the rate value. The temperature adjustment module may adjust the operating temperature towards the remedial temperature when a number (C) of consecutive values of the rate of change are greater than or equal to the rate value, C being an integer greater than zero.

In yet another feature, the temperature adjustment module adjusts the operating temperature toward the remedial temperature while the rate of change is positive. In one example, the temperature adjustment module may adjust the operating temperature towards the remedial temperature while a number (Z) of a consecutive number (W) of the most recent values of the rate of change are greater than or equal to the rate value, Z and W being integers greater than zero. In another example, the temperature adjustment module may adjust the operating temperature towards the remedial temperature while at least a number (T) of a consecutive number (S) of the most recent values of the rate of change are positive, T and S being integers greater than zero.

In still another feature, the temperature adjustment module waits to compare the rate of change and the rate value until the current is greater than or equal to a first current threshold and less than or equal to a second current threshold, the first current threshold being less than the second current threshold.

In another form, the present disclosure provides a control method for a heating element used in an oxygen sensor, the control method comprising periodically determining a rate of change of current through the heating element; periodically comparing the rate of change and a rate value; and selectively adjusting an operating temperature of the oxygen sensor between a normal temperature and a remedial temperature lower than the normal temperature based on the comparing the rate of change and the rate value.

In one feature, the selectively adjusting an operating temperature includes selectively supplying a normal power and a remedial power to the heating element.

In another feature, the selectively adjusting an operating temperature includes adjusting the operating temperature towards the remedial temperature when the rate of change is greater than or equal to the rate value. In one example, the selectively adjusting an operating temperature may include adjusting the operating temperature towards the remedial temperature when a number (C) of consecutive values of the rate of change are greater than or equal to the rate value, C being an integer greater than zero.

In yet another feature, the selectively adjusting an operating temperature includes adjusting the operating temperature toward the remedial temperature while the rate of change is positive. In one example, the selectively adjusting an operating temperature may include adjusting the operating temperature towards the remedial temperature while a number (Z) of a consecutive number (W) of the most recent values of the rate of change are greater than or equal to the rate value, Z and W being integers greater than zero. In another example, the selectively adjusting an operating temperature may include adjusting the operating temperature towards the remedial temperature while at least a number (T) of a consecutive number (S) of the most recent values of the rate of change are positive, T and S being integers greater than zero.

In still another feature, the control method further comprises periodically comparing the current and a first current threshold and a second current threshold, the first current threshold being less than the second current threshold; and waiting to begin periodically comparing the rate of change and the rate value until the current is greater than or equal to the first current threshold and less than or equal to a second current threshold, the first current threshold being less than the second current threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
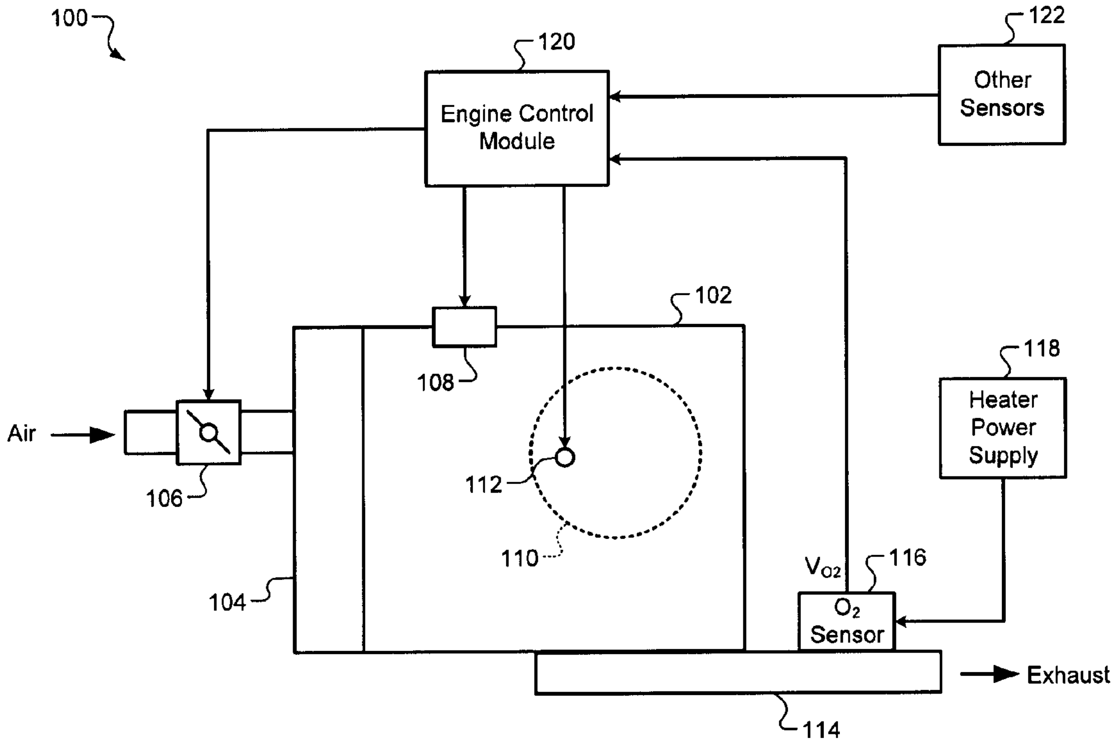
FIG. 1 Prior Art
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure provides a control system and method for detecting liquid water that may have come in contact with an oxygen sensor by monitoring a current supplied to a heater that may be included with the oxygen sensor. The present disclosure also provides a control system and method for operating the heater at a reduced power to ameliorate thermal shock to the oxygen sensor, while maintaining reliable oxygen sensor output.

Figure 2:
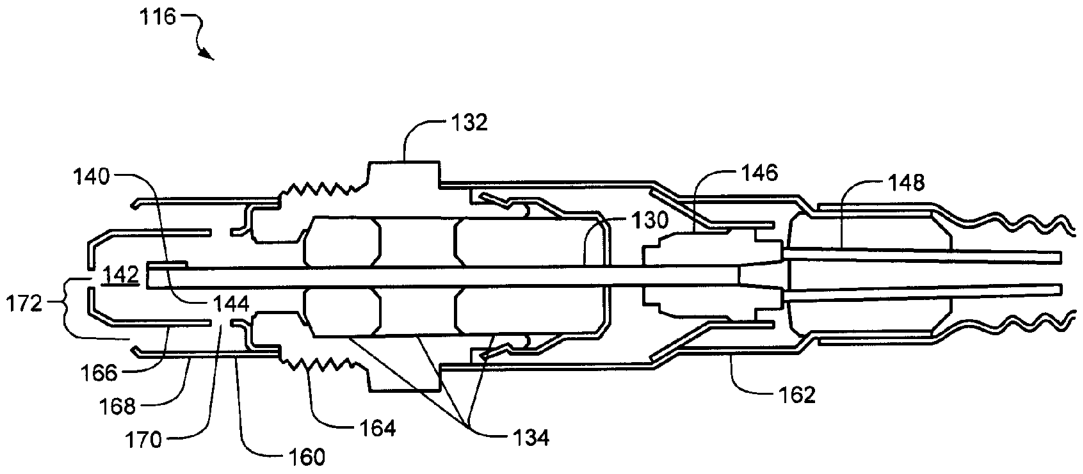
FIG. 2 is a partial cross-sectional view of an exemplary oxygen sensor.

With particular reference to FIG. 2, an exemplary oxygen sensor 116 is shown. The oxygen sensor 116 may include a sensor element assembly 130 supported within a housing 132 by one or more support tubes 134. The sensor element assembly 130 may be of several common types. For example, the sensor element assembly 130 may be of the narrow band type or the wide band type. Narrow band oxygen sensors, such as a conical zirconia sensor, generate a non-linear (i.e. binary) output voltage based on the quantity of oxygen in the exhaust. The output voltage generated by a narrow band oxygen sensor may be used to determine whether the engine 102 is operating in a lean or a rich state. Wide band oxygen sensors, such as a planar zirconia sensor, generate a generally linear output voltage based on the quantity of oxygen in the exhaust. Thus, wide band oxygen sensors may be used to determine the specific oxygen content in the exhaust and whether the engine is operating in a lean or a rich state. As discussed herein, the sensor element assembly 130 is a wide-band oxygen sensor of the planar zirconia sensor type.

Accordingly, the sensor element assembly 130 may be a generally flat, elongate member having a sensing element 140 disposed on one end within a sensing cavity 142 defined by housing 132. The sensing element 140 may include an integral heating element 144. The heating element 144 may be included to provide supplemental heat to warm the sensing element 140 to within a temperature range above its sensitivity temperature. For example, the heating element 144 may be used to warm the sensing element 140 to a temperature above 350° C. The heating element 144 may be formed of various materials, such as, for example, platinum or tungsten. The choice of material may be based on whether the sensor element assembly 130 is of the narrow band or the wide band type.

A contact holder 146 may be disposed on an opposite end to connect electrodes (not shown) of the sensing element 140 and the heating element 144 with wiring 148 of the oxygen sensor 116. The wiring 148 may include four or more wires, depending on the particular configuration of the sensing element 140 and the heating element 144.

The housing 132 may be generally cylindrical in shape and include a sensor cover 160 press fit on one end and a protective sleeve 162 press fit on an opposite end. The housing 132 may further include external threads 164 that may be used to secure the oxygen sensor 116 to the exhaust system 114 such that the sensing element 140 is in communication with the exhaust gas. The sensor cover 160 may be used to shield the sensing element 140 from direct impingement by the exhaust gases. The sensor cover 160 may include an inner shield 166 and an outer shield 168 that work together to define internal and external openings 170, 172 through which exhaust gas may enter cavity 142.

The openings 170, 172 may be of varying sizes. The openings 170, 172 may be located and sized to produce a particular response of the sensor element assembly 130 to changes in the oxygen content of the exhaust gas. Additionally, the openings 170, 172 may be located and sized to affect a thermal response of the sensor element assembly 130 to liquid water impingement. Put another way, the amount of and location where liquid water may contact the sensor element assembly 130 may depend on the location and size of the openings 170, 172 and thereby affect the thermal response of the sensor element assembly 130.

Water condensate may be present in the exhaust system 114 for a variety of reasons. For example, water condensate may be present while the exhaust gas temperature is less than a dew point of the exhaust gas. Water condensate may also be present as a result of water that has pooled within portions of the exhaust system 114, such as within a catalytic converter (not shown), and is carried over from one engine operating cycle to another subsequent engine operating cycle.

Water condensate within the exhaust system 114 may become entrained in the exhaust gas during engine operation. Liquid water entrained in the exhaust gas may enter cavity 142 and come in contact with the sensor element assembly 130, resulting in thermal shock to the sensor element assembly 130. Repeated thermal shock to the oxygen sensor 116 may induce fractures in the sensor element assembly 130 and result in premature failure.

Accordingly, the present disclosure provides a control system and method for detecting liquid water that may be present within cavity 142. Additionally, the present disclosure provides a control system and method for operating the heating element 144 at a reduced power to ameliorate the thermal shock events to the sensor element assembly 130, while maintaining proper operation of the oxygen sensor 116.

The foregoing objectives may be achieved by monitoring current supplied to the heating element 144. More specifically, the presence of liquid water on the sensor element assembly 130 may be detected by monitoring the time rate of change in the current supplied to the heating element 144. Liquid water contacting the sensor element assembly 130 will have a temporary cooling effect on the sensor element assembly 130 as the liquid water comes into contact with the sensor element assembly 130 and subsequently evaporates. Since the resistance of metals such as the platinum and tungsten used to form the heating element 144 decrease with decreasing temperature, temporary increases in the current supplied to the heating element may result when liquid water contacts the sensor element assembly 130.

By monitoring the current supplied to the heating element 144, it is possible to detect the presence of liquid water on the sensor element assembly 130 and take remedial control measures to inhibit thermal shock to the various components of the sensor element assembly 130. Remedial control measures may include temporarily reducing a power (e.g., voltage) supplied to the heating element 144. The power may be reduced to reduce an operating temperature of the sensor element assembly 130. More specifically, the power may be reduced to operate the sensor element assembly 130 at a temperature below a thermal shock temperature of the sensor element assembly 130 yet above a sensitivity temperature of the sensing element 140. In this manner, thermal shock events may be inhibited while ensuring reliable output of the sensing element 140.

Figure 3:
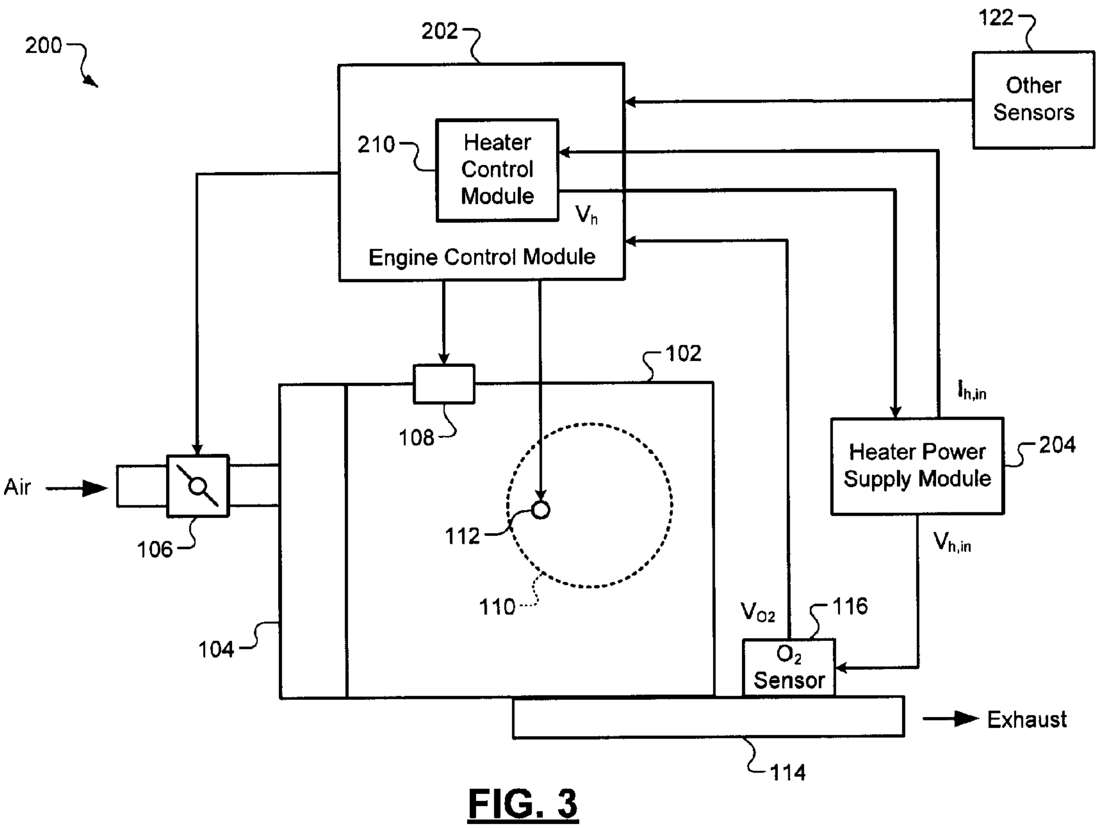
FIG. 3 is a functional block diagram of an engine system according to the principles of the present disclosure.

With particular reference to FIG. 3 an exemplary engine system 200 according to the principles of the present disclosure is shown. The engine system 200 may include an engine 102 regulated by an engine control module (ECM) 202 having an improved $O_2$ sensor control system.

Air is drawn into the engine 102 through an intake manifold 104. A throttle valve 106 may be used to vary the volume of air drawn into the intake manifold 104. The air mixes with fuel that may be dispensed by one or more fuel injectors 108 to form an air and fuel (A/F) mixture. The A/F mixture is combusted within cylinder 110. While a single cylinder 110 is shown, the engine 102 may include two or more cylinders. Combustion of the A/F mixture may be initiated by spark provided by a spark plug 112. Exhaust gas produced during combustion may be expelled from the cylinders to an exhaust system 114.

The exhaust system 114 may include oxygen sensor 116 to measure the amount of oxygen in the exhaust gas. While a single oxygen sensor is shown, the engine system 200 may include two or more oxygen sensors located at various points along the exhaust system 114. The oxygen sensor 116 outputs a voltage ($V_{O2}$) to the ECM 202 that may be used to determine the quantity of oxygen in the exhaust gas. The oxygen sensor 116 includes heating element 144. The heating element 144 may receive power from a heater power supply module 204.

The ECM 202 may be used to regulate the operation of the engine system 100. The ECM 202 may receive the output voltage of the oxygen sensor 116, along with signals from other sensors 122 of the engine 102. Based on the output voltage of the oxygen sensor 116 and the signals it receives from the other sensors 122, the ECM 202 may regulate the A/F mixture by regulating the throttle valve 106 and fuel injectors 108.

The ECM 202 may also be used to regulate the operation of the heating element 144. More specifically, the ECM 202 may include a heater control module 210 that may be connected to the heater power supply module 204. The heater control module 210 may output a heater voltage command signal ($V_h$) to the heater power supply module 204. The heater control module 210 may vary $V_h$ to raise or lower the temperature of the heating element 144 to ameliorate thermal shock to the sensor element assembly 130.

For example, the heater control module 210 may generate $V_h$ to operate the heating element 144 to maintain the temperature of the sensor element assembly 130 at a first temperature for a period of time after starting the engine 102. The first temperature may be below a thermal shock temperature of the oxygen sensor 116. Subsequently, the heater control module 210 may generate $V_h$ to operate the heating element 144 to maintain the temperature of the sensor element assembly 130 at a second temperature higher than the first temperature after a cumulative mass of intake air has been drawn into the engine 102. The second temperature may be above the thermal shock temperature and/or the sensitivity temperature of the oxygen sensor 116. A control system and method for the foregoing oxygen sensor heater control strategy is disclosed in Assignee's commonly owned U.S. Non-provisional application Ser. No. 12/132,653, the disclosure of which is incorporated herein in its entirety by reference.

Additionally, the heater control module 210 may generate $V_h$ to operate the heating element 144 at reduced power when the heater control module 210 determines that water condensate has come into contact with the sensor element assembly 130. In this manner, the heater control module 210 may generate $V_h$ to adjust an operating temperature of the sensor element assembly 130 towards a remedial temperature lower than a normal temperature. More specifically, the heater control module 210 may generate $V_h$ to adjust the operating temperatures of the sensing element 140 and the heating element 144 towards the remedial temperature.

Figure 4:
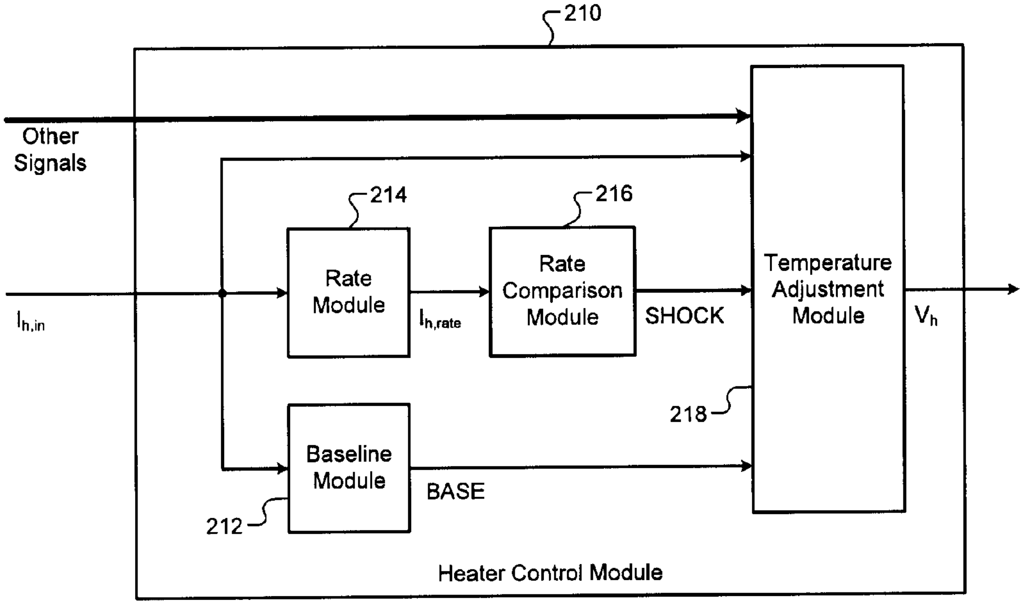
FIG. 4 is a functional block diagram of the heater control module shown in FIG. 3.

With particular reference to FIG. 4, the heater control module 210 may include a baseline module 212, a rate module 214, a rate comparison module 216, and a temperature adjustment module 218. The baseline module 212 receives a current signal ($I_{h,in}$) from the heater power supply module 204 and determines whether the sensor element assembly 130 has achieved a baseline operating state. The baseline module 212 may determine whether the sensor element assembly 130 has achieved a baseline operating state in a variety of ways. For example, the baseline module may determine that the sensor element assembly 130 has achieved a baseline operating state when $I_{h,in}$ is between predetermined limits of a nominal current value associated with the desired operating temperature of the sensor element assembly 130. The baseline module 212 may generate a BASE signal indicating whether the sensor element assembly 130 has achieved a baseline operating state. The baseline module 212 may output the BASE signal to the temperature adjustment module 218.

The rate module 214 receives $I_{h,in}$ from the heater power supply module 204 and determines a time rate of change ($I_{h,rate}$) in the current supplied to the heating element 144. The rate module 214 may output $I_{h,rate}$ to the rate comparison module 216.

The rate comparison module 216 receives $I_{h,rate}$ from the rate module 214 and determines whether water condensate may have come into contact with the sensor element assembly 130 and may cause a shock event. The rate comparison module 216 may determine that water condensate has contacted the sensor element assembly 130 when $I_{h,rate}$ is excessive (e.g., above a threshold value). The rate comparison module 216 may generate a SHOCK signal indicating whether $I_{h,rate}$ is deemed excessive. The rate comparison module 216 may output the SHOCK signal to the temperature adjustment module 218.

The temperature adjustment module 218 receives $I_{h,in}$ and the BASE and SHOCK signals and determines the heater voltage command signal ($V_h$) that may be used to adjust the power supplied to the heating element 144 and thereby raise or lower the temperature of the heating element 144. The temperature adjustment module 218 may determine $V_h$ based on $I_{h,in}$, BASE, and SHOCK. The temperature adjustment module 218 may also receive other signals from various modules of the ECM 202. For example, the temperature adjustment module 218 may receive signals, such as, but not limited to, signals indicating a speed and a run time of the engine 102, a temperature and mass air flow of intake air, and control flags indicating whether the engine system 200 is running properly. The temperature adjustment module 218 may further determine $V_h$ based on the other signals it receives. The temperature adjustment module 218 may output $V_h$ to the heater power supply module 204.

Referring again to FIG. 3, the heater power supply module 204 may be used to regulate the power supplied to the heating element 144 based on the heater voltage command signal ($V_h$) it receives from the ECM 202. For example, the heater power supply module 204 may regulate one or more of a voltage and a current supplied to the heating element 144. As discussed herein and shown in the figures, the heater power supply module 204 regulates the voltage supplied to the heating element 144.

Accordingly, the heater power supply module 204 regulates the voltage ($V_{h,in}$) supplied to the heating element 144 based on the heater voltage command signal ($V_h$) it receives from the ECM 202. The heater power supply module 204 may regulate voltage in a variety of ways. For example, the heater power supply module 204 may regulate a magnitude of the voltage ($V_{h,in}$) supplied to the heating element 144. Alternatively, the heater power supply module 204 may vary a duty cycle of the voltage ($V_{h,in}$) supplied to the heating element 144. In this manner, the heater power supply module 204 may be used to regulate the power supplied to the heating element 144 based on $V_h$. The heater power supply module 204 may also provide a current signal to the ECM 202 indicating the current ($I_{h,in}$) supplied to the heating element 144 as previously discussed.

Figure 5:
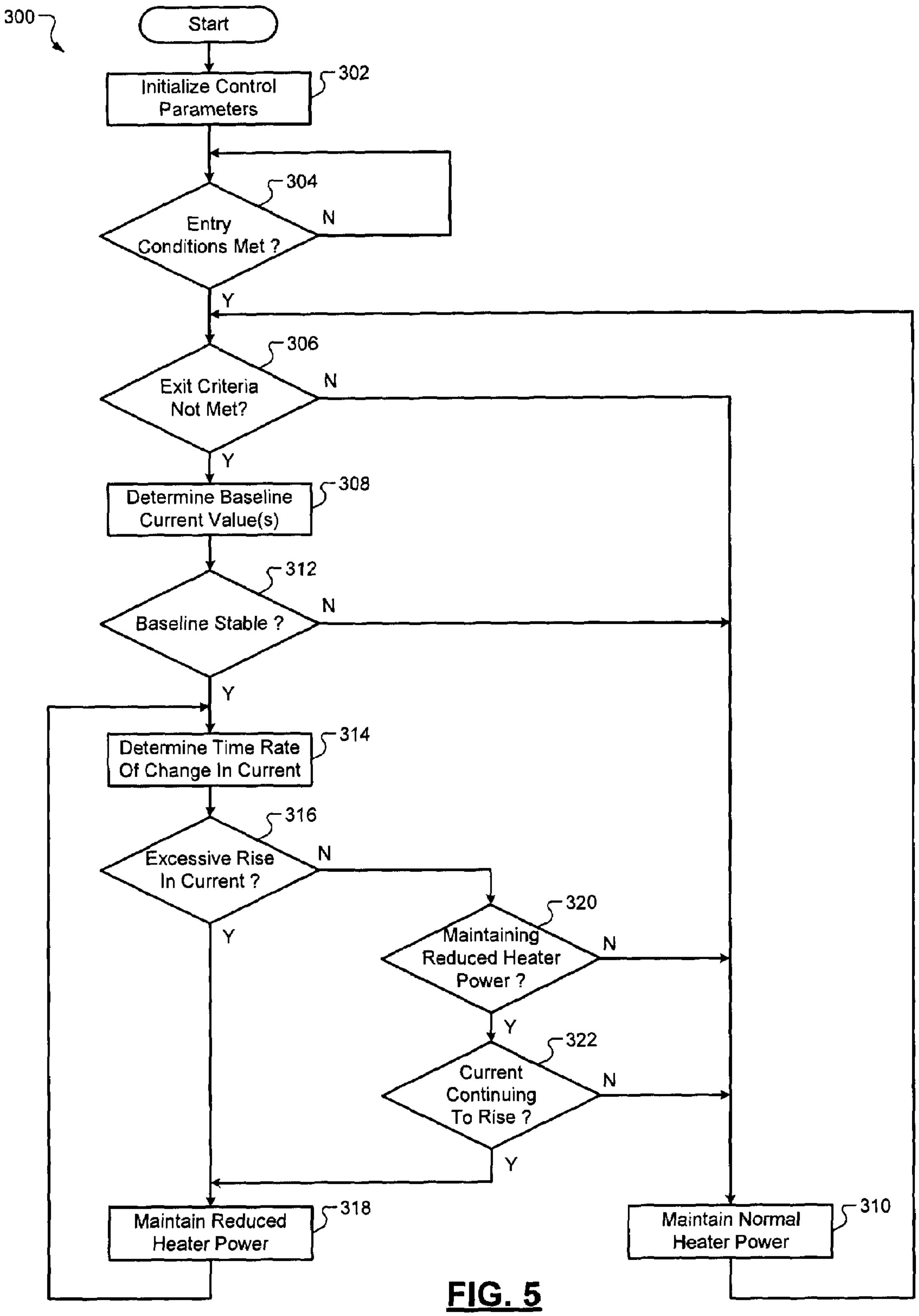
FIG. 5 is a flowchart depicting exemplary control steps performed by a heater control module according to the principles of the present disclosure.

With particular reference to FIG. 5, an exemplary control method 300 is shown. The control method 300 may be implemented as a supplementary control method to other normal heater power control methods. As used herein, normal heater power control refers to control of the heating element 144 to maintain the sensing element 140 within a desired temperature operating range above the sensitivity temperature of the sensing element 140. For example, normal heater power control may be used to maintain the temperature of the sensing element 140 to within a few degrees of 650° C.

The control method 300 may be implemented using the various modules of the ECM 202 described herein. The control method 300 may be run (i.e. executed) at a periodic interval following starting of the engine 102. For example, the control method 300 may be run at a periodic interval of six milliseconds or more. Alternatively, the control method 300 may be run based on the occurrence of a particular event (i.e. event based). For example, the control method 300 may be run once a run flag indicating the heating element 144 should be energized is generated by the ECM 202. As another example, the control method 300 may be run once closed-loop control of the engine 102 has commenced. As discussed herein, the control method 300 is implemented as a supplemental control method to normal heater power control and is run at a periodic interval of six milliseconds following the starting of the engine 102.

Control under the control method 300 begins in step 302 where control initializes control parameters used by the method 300, such as $I_{h,rate}$, BASE, SHOCK, and $V_h$. In step 302, control may set the values of the foregoing parameters to a default value. The default values may correspond to normal heater power control.

Control proceeds in step 304 where control determines whether entry conditions are met. If the entry conditions are met, control proceeds in step 306, otherwise control in the current control loop ends and control loops back as shown. The entry conditions may include various operating conditions of the engine 102 and whether or not a command to operate the heating element 144 has been generated.

For example, the entry conditions may depend on whether the engine 102 has achieved a predetermined engine speed (e.g., RPM) and/or a control flag indicating the engine 102 is operating properly has been generated. The entry conditions may depend on whether or not a temperature of the engine and/or intake air is below a predetermined temperature. The entry conditions may depend on whether the engine has been running for a period of time less than a predetermined value of time or has ingested a cumulative amount of intake air less than a predetermined mass.

In general, the entry conditions will be met during a period of time following starting of the engine 102 when there is a risk of liquid water coming into contact with the oxygen sensor 116 and operation of the heating element 144 under normal heater power has commenced. Put another way, the general entry conditions may be met when the heating element 144 is being operated above a minimum duty cycle under normal heater power control.

In step 306, control determines whether any exit criterion is met. If the exit criteria are not met, then control proceeds in step 308, otherwise control proceeds in step 310 where control maintains normal heater power control. The exit criteria may be met when there is an overriding reason to maintain normal heater power control, which may include inhibiting operation of the heating element 144. For example, the exit criteria may include whether a diagnostic fault related to the oxygen sensor 116 has been generated.

In step 308, control determines a baseline current value based on the $I_{h,in}$ signal generated by the heater power supply module 204. The baseline current value may be generated by monitoring the $I_{h,in}$ signal and applying one or more filtering methods to the value of $I_{h,in}$. The filtering methods may include a first order lag filter. The filtering methods also may include slow filtering of the $I_{h,in}$ signal by exponentially weighted moving averages of values of $I_{h,in}$. In step 308, control may store the baseline current value in memory of the ECM 202 for retrieval in subsequent control steps.

In step 312, control determines whether stable operation of the heating element 144 has been achieved based on one or more of the baseline current values generated in step 308. In step 312, control may generate a BASE signal indicating whether a stable baseline has been achieved. In general, control will determine that a stable baseline has been achieved when the sensing element 140 has been brought to within the desired temperature operating range for a period of time. Control may also determine that a stable baseline has been achieved where an inrush current of the heating element 144 has stabilized. As used herein, inrush current is used to refer to current which rises rapidly during initial operation of the heating element 144.

Control may determine whether a stable baseline has been achieved in a variety of ways. For example, control may determine that the baseline is stable when a number (X) of a number (Y) of successive baseline current values determined in step 308 are within minimum and maximum baseline current values (e.g., $I_{base,min}$<baseline value<$I_{base,max}$). The minimum and maximum baseline current values may be based on a nominal current of the heating element 144 when operating within the desired temperature operating range. The nominal current value may be, for example, between 0.6 and 0.7 amps. The minimum and maximum baseline current values may be based on an expected power of the heating element 144 related to past operation of the engine 102 and the particular operating conditions of the engine 102 when control arrives in step 312. Values for X, Y, $I_{base,min}$, and $I_{base,max}$ may be determined through development testing of the engine system 200 and stored in memory as calibration values used by control method 300.

In step 314, control determines a time rate of change in the current supplied to the heating element 144 ($I_{h,rate}$) based on $i_{h,in}$. Control may determine the value of $I_{h,rate}$ in a variety of ways. Control may determine $I_{h,rate}$ using the $I_{h,in}$ signal generated by the heater power supply module 204 or using the baseline current values determined in step 308. The period of time used to determine $I_{h,rate}$ may be the period of time between successive control cycles (e.g., 6 milliseconds) or may be for a predetermined period of time greater than the period of time between successive control cycles. For example, the period of time used to determine $I_{h,rate}$ may be around one second. In step 314, control may store the value of $I_{h,rate}$ in memory.

In step 316, control determines whether an excessive rise in heater current has occurred, indicating that liquid water may have come into contact with the sensor element assembly 130. More specifically, control determines whether an excessive rise in heater current has occurred based on a comparison of one or more $I_{h,rate}$ values determined in step 314 and a threshold current rate value ($I_{rate,thresh}$). If control determines an excessive rise in current has occurred, control proceeds in step 318, otherwise control proceeds in step 320. In step 316, control may generate a SHOCK signal indicating whether control has determined an excessive rise in heater current has occurred.

Control may determine whether an excessive rise in heater current has occurred in a number of ways. For example, control may compare the most recent $I_{h,rate}$ value determined in step 314 and $I_{rate,thresh}$. If the most recent value of $I_{h,rate}$ is greater than $I_{rate,thresh}$ then control may determine that an excessive rise in current has occurred. Alternatively, control may compare a consecutive number (W) of the most recent values of $I_{h,rate}$ and $I_{rate,thresh}$. If a predetermined number (Z) of the W most recent values of $I_{h,rate}$ are above $I_{rate,thresh}$, then control may determine that an excessive rise in current has occurred. Values for W, Z, and $I_{rate,thresh}$ may be determined through development testing of the engine system 200 and stored in memory as calibration values used by control method 300.

In step 318, control operates the heating element 144 at a reduced heater power as a remedial measure to lower the temperature of the sensor element assembly 130 and thereby inhibit thermal shock. Control may regulate the power to adjust the operating temperature of the sensor element assembly 130 towards the remedial temperature. Control may further regulate the power to maintain the operating temperature of the sensor element assembly 130 at the remedial temperature.

Accordingly, in step 318, control may generate $V_{h,in}$ to operate the heating element 144 in order to maintain the temperature of the sensor element assembly 130 below the thermal shock temperature of the sensor element assembly 130, yet above the sensitivity temperature of the sensing element 140. Where the thermal shock temperature of the sensor element assembly 130 is below the sensitivity temperature of the sensing element 140, control may generate $V_{h,in}$ to maintain the temperature of the sensing element 140 to a temperature at or just above the sensitivity temperature. From step 318, control in the current control loop ends and control loops back and begins the next control loop in step 314 as shown.

In step 320, control determines whether control is currently operating the heating element 144 at reduced heater power. If control is currently operating the heating element 144 at reduced heater power, control proceeds in step 322, otherwise control proceeds in step 310.

In step 322, control determines whether the heater current is continuing to rise, indicating that there may still be liquid water present on the sensor element assembly 130. More specifically, control determines whether the heater current is continuing to rise based on a comparison of one or more $I_{h,rate}$ values determined in step 314. If control determines the heater current is continuing to rise, control proceeds in step 318 where control continues to maintain reduced heater power, otherwise control proceeds in step 310.

Control may determine whether the heater current continues to rise in a number of ways. For example, if the most recent $I_{h,rate}$ value determined in step 314 is positive (i.e. current value of $I_{h,rate}$), control may determine that the heater current is continuing to rise. Alternatively, control may evaluate a consecutive number (S) of the most recent values of $I_{h,rate}$. If a predetermined number (T) of the S most recent values $I_{h,rate}$ are positive, then control may determine that the current is continuing to rise. Control may determine that the current is not continuing to rise where a number (U) of the most recent $I_{h,rate}$ values is not positive. Values for S, T, and U may be determined through development testing of the engine system 200 and stored in memory as calibration values used by control method 300.

In step 310, control operates the heating element 144 under normal heater power control. From step 310, control in the current control loop ends and control loops back and begins the next control loop in step 306 as shown.

In the foregoing manner, control method 300 may be used to detect the presence of liquid water within the oxygen sensor 116 and regulate the operation of the heating element 144 to ameliorate thermal shock to the various components of the sensor element assembly 130. Thus, control method 300 may also be used to improve the durability and reliability of the oxygen sensor 116.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a heating element used in an oxygen sensor, the control system comprising:

a rate module that periodically determines a time rate of change of current through said heating element; and a temperature adjustment module that periodically compares said time rate of change and a rate value and selectively adjusts a target operating temperature of said oxygen sensor between a normal temperature and a remedial temperature lower than said normal temperature based on a comparison of said time rate of change and said rate value, wherein said temperature adjustment module adjusts an operating temperature of said oxygen sensor towards said remedial temperature when said time rate of change is greater than or equal to said rate value.

2. An oxygen sensor control system comprising:

the control system of claim 1;

said oxygen sensor including said heating element; and a power supply module that supplies a power to said heating element based on a power control signal, wherein said temperature adjustment module generates said power control signal to adjust an operating temperature of said oxygen sensor based on said target operating temperature.

3. The control system of claim 1 wherein said temperature adjustment module adjusts said operating temperature towards said remedial temperature when a number (C) of consecutive values of said time rate of change are greater than or equal to said rate value, C being an integer greater than zero.

4. The control system of claim 1 wherein said temperature adjustment module adjusts said operating temperature toward said remedial temperature while said time rate of change is positive.

5. The control system of claim 1 wherein said temperature adjustment module adjusts said operating temperature towards said remedial temperature while a number (Z) of a consecutive number (W) of most recent values of said time rate of change are greater than or equal to said rate value, Z and W being integers greater than zero.

6. The control system of claim 1 wherein said temperature adjustment module adjusts said operating temperature towards said remedial temperature while at least a number (T) of a consecutive number (S) of most recent values of said time rate of change are positive, T and S being integers greater than zero.

7. The control system of claim 1 wherein said temperature adjustment module waits to compare said time rate of change and said rate value until said current is greater than or equal to a first current threshold and less than or equal to a second current threshold, said first current threshold being less than said second current threshold.

8. The control system of claim 1 wherein said remedial temperature is lower than a thermal shock temperature of said oxygen sensor.

9. The control system of claim 1 wherein said operating temperature is the operating temperature of a sensing element and said remedial temperature is greater than a sensitivity temperature of said sensing element.

10. A control method for a heating element used in an oxygen sensor, the control method comprising:

periodically determining a time rate of change of current through said heating element;

periodically comparing said time rate of change and a rate value;

selectively adjusting a target operating temperature of said oxygen sensor between a normal temperature and a remedial temperature lower than said normal temperature based on said comparing said time rate of change and said rate value; and adjusting an operating temperature of said oxygen sensor towards said remedial temperature when said time rate of change is greater than or equal to said rate value.

11. The control method of claim 10 wherein said selectively adjusting said target operating temperature includes selectively supplying a normal power and a remedial power to said heating element, said normal power corresponding to said normal temperature, said remedial power corresponding to said remedial temperature.

12. The control method of claim 10 wherein said adjusting said operating temperature further includes adjusting said operating temperature towards said remedial temperature when a number (C) of consecutive values of said time rate of change are greater than or equal to said rate value, C being an integer greater than zero.

13. The control method of claim 10 wherein said adjusting said operating temperature further includes adjusting said operating temperature toward said remedial temperature while said time rate of change is positive.

14. The control method of claim 10 wherein said adjusting said operating temperature further includes adjusting said operating temperature towards said remedial temperature while a number (Z) of a consecutive number (W) of most recent values of said time rate of change are greater than or equal to said rate value, Z and W being integers greater than zero.

15. The control method of claim 10 wherein said adjusting said operating temperature further includes adjusting said operating temperature towards said remedial temperature while at least a number (T) of a consecutive number (S) of most recent values of said time rate of change are positive, T and S being integers greater than zero.

16. The control method of claim 10 further comprising:

periodically comparing said current and a first current threshold and a second current threshold, said first current threshold being less than said second current threshold; and waiting to begin said periodically comparing said time rate of change and said rate value until said current is greater than or equal to said first current threshold and less than or equal to said second current threshold.

17. The control method of claim 10 wherein said remedial temperature is lower than a thermal shock temperature of said oxygen sensor.

18. The control method of claim 10 wherein said operating temperature is the operating temperature of a sensing element and said remedial temperature is greater than a sensitivity temperature of said sensing element.

19. A control system for a heating element used in an oxygen sensor, the control system comprising:

a rate module that periodically determines a rate of change of current through said heating element; and a temperature adjustment module that periodically compares said rate of change and a rate value and selectively adjusts an operating temperature of said oxygen sensor between a normal temperature and a remedial temperature lower than said normal temperature based on a comparison of said rate of change and said rate value, wherein said temperature adjustment module waits to compare said rate of change and said rate value until said current is greater than or equal to a first current threshold and less than or equal to a second current threshold, said first current threshold being less than said second current threshold, and wherein said temperature adjustment module adjusts said operating temperature towards said remedial temperature when said rate of change is greater than or equal to said rate value.

20. A control method for a heating element used in an oxygen sensor, the control method comprising:

periodically determining a rate of change of current through said heating element;

periodically comparing said current and a first current threshold and a second current threshold, said first current threshold being less than said second current threshold;

periodically comparing said rate of change and a rate value, wherein said periodically comparing said rate of change and said rate value includes waiting to begin said periodically comparing said rate of change and said rate value until said current is greater than or equal to said first current threshold and less than or equal to said second current threshold; and selectively adjusting an operating temperature of said oxygen sensor between a normal temperature and a remedial temperature lower than said normal temperature based on said comparing said rate of change and said rate value, wherein said selectively adjusting said operating temperature includes adjusting said operating temperature towards said remedial temperature when said rate of change is greater or equal to said rate value.

* * * * *